(12) United States Patent
Higuchi et al.

(10) Patent No.: US 7,834,137 B2
(45) Date of Patent: Nov. 16, 2010

(54) PROCESS FOR PRODUCING AQUEOUS FLUORINATED POLYMER DISPERSION HAVING REDUCED CONTENT OF FLUORINATED EMULSIFIER

(75) Inventors: Shinya Higuchi, Chiyoda-ku (JP); Jun Hoshikawa, Chiyoda-ku (JP); Hiroki Kamiya, Chiyoda-ku (JP); Yasuhiko Matsuoka, Chiyoda-ku (JP); Hiroki Nagai, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/434,075

(22) Filed: May 1, 2009

(65) Prior Publication Data

US 2009/0221726 A1   Sep. 3, 2009

Related U.S. Application Data

(63) Continuation of application No. PCT/JP2007/071404, filed on Nov. 2, 2007.

(30) Foreign Application Priority Data

Nov. 24, 2006  (JP) .............................. 2006-316821

(51) Int. Cl.
*C08F 6/00* (2006.01)
*C08J 3/00* (2006.01)

(52) U.S. Cl. .................... 528/480; 264/176.1; 264/219; 521/30; 524/544; 526/74; 526/206; 526/213; 528/502 A

(58) Field of Classification Search ............... 264/176.1, 264/219; 521/30; 524/544; 526/74, 206, 526/213; 528/502 A, 480
See application file for complete search history.

(56) References Cited

U.S. PATENT DOCUMENTS 3,882,153 A   5/1975 Seki et al.
4,189,551 A * 2/1980 Gangal ......................... 526/74
6,743,957 B2 * 6/2004 Fuda et al. ................... 570/179
7,279,522 B2 * 10/2007 Dadalas et al. ............... 524/544
2006/0183842 A1  8/2006 Johnson

FOREIGN PATENT DOCUMENTS

| DE | 19857111 | * | 6/2000 |
|---|---|---|---|
| EP | 1364972 | * | 11/2003 |
| JP | 2002-532583 | | 10/2002 |
| JP | 2005-501956 | | 1/2005 |
| JP | 2005-200650 | | 7/2005 |
| JP | 2006-515375 | | 5/2006 |
| JP | 2006-188704 | | 7/2006 |
| JP | 2007-51255 | | 3/2007 |
| WO | 2004/078836 | | 9/2004 |
| WO | 2006/086793 | | 8/2006 |
| WO | 2006/086795 | | 8/2006 |

* cited by examiner

*Primary Examiner*—Terressa M Boykin
(74) *Attorney, Agent, or Firm*—Oblon, Spivak, McClelland, Maier & Neustadt, L.L.P.

(57) ABSTRACT

Provided is a process for producing an aqueous fluorinated polymer dispersion having a reduced content of a fluorinated emulsifier by using a weakly basic anion-exchange resin to adsorb and remove a fluorinated emulsifier with excellent efficiency from an aqueous fluorinated polymer dispersion. Also provided is a process for producing an aqueous fluorinated polymer dispersion having a reduced content of a fluorinated emulsifier, wherein the process includes: adding an organic carboxylic acid represented by the following formula (1):

$$Q(CH_2)_m(CH(OH))_nCOOH \quad (1)$$

wherein Q is H, $CH_3$ or COOH, m and n each independently represent 0 or an integer of from 1 to 4, and $4 \geq n+m \geq 1$, to an aqueous fluorinated polymer dispersion containing a fluorinated emulsifier; and then contacting with a weakly basic anion-exchange resin to adsorb and remove the fluorinated emulsifier.

9 Claims, No Drawings

PROCESS FOR PRODUCING AQUEOUS FLUORINATED POLYMER DISPERSION HAVING REDUCED CONTENT OF FLUORINATED EMULSIFIER

CROSS-REFERENCE TO RELATED APPLICATIONS

The present application is a continuation of International patent application PCT/JP2007/071404, filed on Nov. 2, 2007, which claims priority to Japanese patent application JP 2006-316821, filed on Nov. 24, 2006.

TECHNICAL FIELD

The present invention relates to a process for producing an aqueous fluorinated polymer dispersion having a reduced content of a fluorinated emulsifier by using a weakly basic anion-exchange resin.

BACKGROUND ART

When a fluorinated polymer such as polytetrafluoroethylene (hereinafter referred to as PTFE), a melt-moldable type fluororesin or a fluoroelastomer is formed by using an emulsion polymerization method, a fluorinated emulsifier is usually used since it does not hinder the polymerization reaction of a fluorinated monomer by chain transfer in an aqueous medium. Ammonium perfluorooctanoate (hereinafter referred to as APFO) is usually used as the fluorinated emulsifier.

An aqueous PTFE emulsion is obtained by emulsion polymerization of tetrafluoroethylene (hereinafter referred to as TFE). The aqueous emulsion is coagulated and dried to produce a fine powder of PTFE. The fine powder is shaped by a method such as paste extrusion and then used for various applications. On the other hand, an aqueous PTFE dispersion obtained by having the aqueous PTFE emulsion treated for stability or concentrated, as the case requires, is used for various coating or impregnation applications by adding various additives.

However, the fluorinated emulsifier is expensive, and the amount of its use is substantially influential over the production cost of the fluorinated polymer. Further, the fluorinated emulsifier is a substance which is not decomposable in nature, and accordingly, in recent years, it is desired to reduce not only waste water from a plant, but also the amount of a fluorinated emulsifier contained in an aqueous fluorinated polymer dispersion obtained.

In 2005, the U.S.A. Fluoropolymers Manufacturing Group of Society of Plastics Industries submitted to the U.S.A. Environmental Protection Agency a proposal for 90% reduction of APFO content in aqueous fluorinated polymer dispersion products relative to in 2000. As the reduction method, a method was proposed wherein an aqueous fluorinated polymer dispersion is contacted with a basic anion-exchange resin to adsorb and remove APFO.

For example, a process for producing an aqueous fluorinated polymer dispersion having a reduced content of a fluorinated emulsifier is proposed (Patent Documents 1, 2, 3, 4, 5 and 6), wherein a nonionic surfactant is added to an aqueous fluorinated polymer emulsion to produce an aqueous fluorinated polymer dispersion. Then, the aqueous fluorinated polymer dispersion is contacted with a basic anion-exchange resin to adsorb and remove a fluorinated emulsifier. Then, the aqueous dispersion is separated from the basic anion-exchange resin.

In the above conventional technique, a strongly basic anion-exchange resin is mainly used. It is said that by using the strongly basic anion-exchange resin, a fluorinated emulsifier can be adsorbed and removed efficiently from an aqueous fluorinated polymer dispersion as compared with the use of a weakly basic anion-exchange resin. However, if the strongly basic anion-exchange resin is used, the aqueous fluorinated polymer dispersion becomes easily coagulated and it is necessary to pay attention on the concentration control of a nonionic surfactant for improving the stability.

Further, since the counter ions of functional groups in the strongly basic anion-exchange resin are chlorine ions, it is concerned that the chlorine ions might be included in the aqueous fluorinated polymer dispersion, or that pipes might be corroded. Though it is possible to change the counter ions to hydroxyl ions ($OH^-$ ions) by preliminarily treating the strongly basic anion-exchange resin with an aqueous alkaline solution, it is then necessary to install a new production facility and the cost becomes high. Further, it is described that the counter ion is exchanged by a fluoride or oxalate in order to increase the efficiency of adsorption (Patent Documents 1, 2 and 4), but such is disadvantageous from the viewpoint of the cost performance.

Furthermore, when the aqueous fluorinated polymer dispersion is passed through a column packed with the strongly basic anion-exchange resin, the pH generally tends to be strongly alkaline after the passing therethrough. As a result, the decomposition of a nonionic surfactant is induced, and discoloration is likely to occur. Therefore, it is proposed to sufficiently lower the pH before the passing therethrough (Patent Document 6). Further, when the counter ions of the strongly basic anion-exchange resin are changed to the hydroxyl ions, the alkalinity becomes stronger and the resin itself becomes easy to decompose. Further, when the fluorinated emulsifier is eluted and recovered by using the strongly basic anion-exchange resin, the recovery efficiency is generally low as compared with the use of a weakly basic anion-exchange resin.

On the other hand, it is disadvantageous that a weakly basic anion-exchange resin is required to be used in a larger amount than the strongly basic anion-exchange resin during the recovery of the fluorinated emulsifier. However, it has been found that when the aqueous fluorinated polymer dispersion is contacted with the weakly basic anion-exchange resin, by an artifice for operation such as connecting many columns and changing sequentially saturated columns, the efficiency for removal of the fluorinated emulsifier is improved. However, it has been found that the efficiency for adsorption and removal of the fluorinated emulsifier tends to be low in a case where the molecular weight of the fluorinated polymer is high, or the concentration of the fluorinated emulsifier is high in the aqueous fluorinated polymer dispersion.

Accordingly, it is desired to develop a process for removing a fluorinated emulsifier efficiently from an aqueous fluorinated polymer dispersion, and producing an aqueous fluorinated polymer dispersion having a reduced content of a fluorinated emulsifier.

Patent Document 1: JP-A-2002-532583
Patent Document 2: JP-A-2005-501956
Patent Document 3: JP-A-2006-515375
Patent Document 4: WO2004/078836
Patent Document 5: WO2006/086793
Patent Document 6: WO2006/086795

DISCLOSURE OF THE INVENTION

Object to be Accomplished by the Invention

It is an object of the present invention to provide a process for producing an aqueous fluorinated polymer dispersion having a reduced content of a fluorinated emulsifier by using a weakly basic anion-exchange resin to remove a fluorinated emulsifier with excellent efficiency of adsorption from an aqueous fluorinated polymer dispersion.

Means to Accomplish the Object

The present invention is to accomplish the above object and provide the following.

[1] A process for producing an aqueous fluorinated polymer dispersion having a reduced content of a fluorinated emulsifier, which comprises adding an organic carboxylic acid represented by the following formula (1):

$$Q(CH_2)_m(CH(OH))_nCOOH \quad (1)$$

(wherein Q is H, $CH_3$ or COOH, each of m and n which are independent of each other, is 0 or an integer of from 1 is to 4, and $4 \geq n+m \geq 1$.)

to an aqueous fluorinated polymer dispersion containing a fluorinated emulsifier, followed by contact with a weakly basic anion-exchange resin to adsorb and remove the fluorinated emulsifier.

[2] The process for producing an aqueous fluorinated polymer dispersion according to the above [1], wherein the organic carboxylic acid represented by the formula (1) is $HOCO(CH_2)_pCOOH$ (wherein p is an integer of from 1 to 4).

[3] The process for producing an aqueous fluorinated polymer dispersion according to the above [1], wherein the organic carboxylic acid represented by the formula (1) is $HOCOCH_2CH(OH)COOH$ or $CH_3CH(OH)COOH$.

[4] The process for producing an aqueous fluorinated polymer dispersion according to any one of the above [1] to [3], wherein the aqueous fluorinated polymer dispersion is an aqueous dispersion of polytetrafluoroethylene.

[5] The process for producing an aqueous fluorinated polymer dispersion according to the above [4], wherein the standard specific gravity of the polytetrafluoroethylene in the aqueous polytetrafluoroethylene dispersion is from 2.15 to 2.20.

[6] The process for producing an aqueous fluorinated polymer dispersion according to any one of the above [1] to [5], wherein the content of the fluorinated emulsifier in the aqueous fluorinated polymer dispersion after contact with the weakly basic anion-exchange resin is from 1 ppm to 200 ppm to the fluorinated polymer.

[7] The process for producing an aqueous fluorinated polymer dispersion according to any one of the above [1] to [6], wherein the content of the fluorinated emulsifier in the aqueous fluorinated polymer dispersion before contact with the weakly basic anion-exchange resin is from 750 ppm to 20,000 ppm to polytetrafluoroethylene in a case where the fluorinated polymer is the polytetrafluoroethylene, from 250 ppm to 250,000 ppm to a melt-moldable type fluororesin in a case where the fluorinated polymer is the melt-moldable type fluororesin and from 1,000 ppm to 50,000 ppm to a fluororubber in a case where the fluorinated polymer is the fluororubber.

[8] The process for producing an aqueous fluorinated polymer dispersion according to any one of the above [1] to [7], wherein the content of the organic carboxylic acid in the aqueous fluorinated polymer dispersion is from 100 ppm to 1,000 ppm to the aqueous fluorinated polymer dispersion.

[9] An aqueous fluorinated polymer dispersion having a reduced content of a fluorinated emulsifier, produced by using the process for producing an aqueous fluorinated polymer dispersion as defined in any one of the above [1] to [8].

EFFECT OF THE INVENTION

According to the present invention, before the fluorinated emulsifier is contacted with the weakly basic anion-exchange resin (hereinafter referred to as WBIER), a small amount of the organic carboxylic acid represented by the formula (1) is added to the aqueous fluorinated polymer dispersion, whereby it is possible to efficiently adsorb and remove the fluorinated emulsifier from the aqueous fluorinated polymer dispersion. That is, it becomes possible to prevent the fluorinated polymer from coagulating on the surface of WBIER, and to improve the efficiency for elution and recovery of the fluorinated emulsifier by WBIER.

Even when the obtained aqueous fluorinated polymer dispersion is impregnated to and baked on, for example, a glass fiber, coloration can be prevented. Further, in the obtained aqueous fluorinated polymer dispersion, there is no inclusion of chlorine ions which otherwise present adverse effects on the production line for various products.

BEST MODE FOR CARRYING OUT THE INVENTION

In the present invention, an organic carboxylic acid represented by the following formula (1):

$$Q(CH_2)_m(CH(OH))_nCOOH \quad (1)$$

(wherein Q is H, $CH_3$ or COOH, each of m and n which are independent of each other, is 0 or an integer of from 1 to 4, and $4 \geq n+m \geq 1$.)

is added to an aqueous fluorinated polymer dispersion.

The organic carboxylic acid is preferably $HOCO(CH_2)_mCOOH$ i.e. in the formula (1), Q is COOH and n is 0. Specific examples of the organic carboxylic acid may be $HOCOCH_2COOH$ (malonic acid), $HOCO(CH_2)_2COOH$ (succinic acid), $HOCO(CH_2)_3COOH$ (glutaric acid) and $HOCO(CH_2)_4COOH$ (adipic acid). $HOCO(CH_2)_2COOH$ and $HOCO(CH_2)_3COOH$ are more preferred.

Other preferable specific examples of the organic carboxylic acid may be $HOCOCH_2CH(OH)COOH$ (malic acid), $CH_3CH(OH)COOH$ (lactic acid), $HOCO(CH(OH))_2COOH$ (tartaric acid) and $HOCO(CH(OH))_4COOH$ (D-galactaric acid and D-glucaric acid). $HOCOCH_2CH(OH)COOH$ and $CH_3CH(OH)COOH$ are more preferred.

Further, $CH_3COOH$ (acetic acid), $CH_3CH_2COOH$ (propionic acid), $CH_3(CH_2)_2COOH$ (butyric acid) or $CH_3(CH_2)_3COOH$ (valeric acid) may be mentioned, but it may be necessary to cope with a case when the odor is strong.

The above organic carboxylic acid preferably has an acid dissociation constant of the first stage at 25° C. being from 2.5 to 5.0. Further, since it is decomposed and evaporated during processing of the aqueous fluorinated polymer dispersion, it is possible to prevent discoloration during, for example, the impregnation and baking on a glass fiber. Since the effect is obtainable with a small amount of the organic carboxylic acid, the physical properties of the aqueous fluorinated polymer dispersion, such as the shear stability, viscosity curve, etc., will not be impaired. If the acid dissociation constant is less than 2.5, the adsorption of the fluorinated emulsifier to WBIER is hindered. If the acid dissociation constant exceeds 5, such a numerical value is reached after the second or later stage dissociation of a polyfunctional carboxylic acid. Even with a polyfunctional carboxylic acid, the first dissociation constant determining the adsorption with WBIER is generally at most 5.

The content of the organic carboxylic acid represented by the formula (1) to be used in the present invention is preferably from 100 ppm to 1,000 ppm to the mass of the aqueous fluorinated polymer dispersion. More preferred is from 150 ppm to 900 ppm and most preferred is from 200 ppm to 700 ppm. If the content is less than 100 ppm, it is likely that the efficiency of adsorption and removal of the fluorinated emulsifier tends to be insufficient, and if the content is more than 1,000 ppm, it is likely that the properties of the aqueous fluorinated polymer dispersion tend to change and the organic carboxylic acid may remain in the fluorinated polymer even after post-processing.

No special conditions are required for the method of mixing the aqueous fluorinated polymer dispersion with the organic carboxylic acid represented by the formula (1), and it is enough that the organic carboxylic acid represented by the formula (1) is added and mixed, as it is, or in the form of its solution, with the aqueous fluorinated polymer dispersion at room temperature.

When a water-soluble organic peroxide such as disuccinic acid peroxide is used as an initiator for the production of a fluorinated polymer, an organic carboxylic acid may remain in an aqueous fluorinated polymer dispersion as a polymerization residue. When the organic carboxylic acid as the polymerization residue is the organic carboxylic acid represented by the formula (1), the sum of the one derived from the water-soluble organic peroxide and the organic carboxylic acid represented by the formula (1) added later is preferably from 100 ppm to 1,000 ppm to the mass of the aqueous fluorinated polymer dispersion. The sum is more preferably from 200 ppm to 1,000 ppm, further preferably from 250 ppm to 1,000 ppm, most preferably from 250 ppm to 800 ppm.

In the present invention, the molecular weight of the fluorinated polymer in the aqueous fluorinated polymer dispersion is not particularly limited, and various molecular weights may be employed without any particular restrictions.

When the fluorinated polymer in the aqueous fluorinated polymer dispersion is PTFE, the standard specific gravity of PTFE is preferably within a range of from 2.14 to 2.25, more preferably from 2.15 to 2.20, most preferably from 2.15 to 2.19. The standard specific gravity means a standard specific gravity of a molded product which is obtained by such a procedure that a PTFE fine powder obtained by coagulating the aqueous PTFE dispersion is subjected to compression-molding under a specific condition, followed by baking. This value is an index for an average molecular weight, and generally, the smaller the standard specific gravity, the larger the molecular weight. The number average molecular weight of the fluorinated polymer is preferably from 30,000 to 30,000,000, more preferably from 100,000 to 30,000,000.

The process of the present invention is excellent in the efficiency for adsorption of the fluorinated emulsifier in an aqueous high molecular weight fluorinated polymer dispersion containing little organic carboxylic acid as a polymerization residue derived from a water-soluble organic peroxide used as a initiator.

The reason why the organic carboxylic acid represented by the formula (1) of the present invention enhances the adsorption of the fluorinated emulsifier to WBIER is not definitely clear, but it is considered as follows.

Generally, WBIER is used for ion adsorption in an acidic to neutral pH range. An aqueous fluorinated polymer dispersion containing an ammonium salt of a fluorinated emulsifier is usually acidic. Therefore, even with WBIER, a sufficient ion-exchange ability is provided, whereby the fluorinated emulsifier can be adsorbed and removed efficiently. However, the pH of the aqueous fluorinated polymer dispersion which is acidic at an initial stage, will change to an alkaline side as passing thorough WBIER is continued. The reason is such that upon adsorption of the fluorinated emulsifier on WBIER, hydroxyl ions as counter ions of WBIER are freed. If the pH of the aqueous fluorinated polymer dispersion changes to alkaline, the fluorinated emulsifier tends to be hardly adsorbed.

It is considered that the organic carboxylic acid represented by the formula (1) reacts with the hydroxyl group ions freed from WBIER following the adsorption of fluorinated emulsifier and plays a role to prevent the pH of the aqueous fluorinated polymer dispersion from changing to an alkaline side. Further, it is considered that the organic carboxylic acid itself may also be adsorbed by a basic anion-exchange resin, but the adsorbed organic carboxylic acid will be substituted by the fluorinated emulsifier.

The pH of the aqueous fluorinated polymer dispersion is preferably from 2 to 4, particularly preferably from 2.5 to 3.5.

The ion selectivity of the organic carboxylic acid represented by the formula (1) for WBIER is preferably substantially equal to or less than that of the fluorinated emulsifier. Further, the organic carboxylic acid represented by the formula (1) has a relatively low boiling point, and therefore, it will scarcely remain under a baking condition usually exercised after the aqueous fluorinated polymer dispersion is coated, such being desirable.

For the aqueous fluorinated polymer dispersion of the present invention, for example, an aqueous fluorinated polymer dispersion can be used, which is obtained by adding for stabilization a nonionic surfactant to an aqueous fluorinated polymer emulsion obtained by emulsion-polymerization method, wherein a fluorinated monomer is homo-polymerized or copolymerized by using the fluorinated emulsifier in an aqueous medium in the presence of a stabilizing agent, a polymerization initiator, etc. The emulsion-polymerization conditions of the fluorinated monomer are usually such that the polymerization temperature is preferably from 10 to 95° C., the polymerization pressure is preferably from 0.5 to 4.0 MPa, and the polymerization time is preferably from 70 to 520 minutes.

In the present invention, the fluorinated emulsifier may, for example, be a fluorinated alkyl carboxylic acid or its salt (ammonium salt or alkali metal salt), or a fluorinated alkane sulfonic acid or its salt (ammonium salt or alkali metal salt). The fluorinated alkyl group in the fluorinated alkyl carboxylic acid or fluorinated alkane sulfonic acid may have an etheric oxygen atom.

Specific examples of the fluorinated emulsifier may, for example, be perfluorohexanoic acid, perfluoroheptanoic acid, perfluorooctanoic acid and perfluorononanoic acid. Further, the fluorinated carboxylic acid having an etheric oxygen atom may, for example, be $C_3F_7OCF(CF_3)CF_2OCF(CF_3)COOH$, $C_2F_5OCF(CF_3)CF_2OCF(CF_3)COOH$, $C_4F_9OC_2F_4OCF_2COOH$, $C_3F_7OC_2F_4OCF_2COOH$, $C_2F_5OC_2F_4OCF_2COOH$, $CF_3OC_2F_4OCF_2COOH$, $C_4F_9OCF_2COOH$ or $C_4F_9OCF(CF_3)COOH$. Further, the fluorinated emulsifier having a hydrogen atom may, for example, be ω-hydroperfluorooctanoic acid. The fluorinated alkane sulfonic acid may, for example, be perfluorooctane sulfonic acid or $C_6F_{13}CH_2CH_2SO_3H$. Particularly, their ammonium salts are more preferred.

In the case of PTFE, to the yield of PTFE finally obtained (hereinafter referred to as final PTFE yield), the amount of the fluorinated emulsifier is preferably from 750 ppm to 20,000 ppm, more preferably from 1,000 ppm to 20,000 ppm, most preferably from 1,000 ppm to 10,000 ppm. Generally, if the amount is too much, the structure of PTFE primary particle tends to have a stick shape, and the aqueous PTFE emulsion becomes unstable.

In the case of the melt-moldable type fluororesin, to the yield of the melt-moldable type fluororesin finally obtained, the amount of the fluorinated emulsifier is preferably from 250 ppm to 250,000 ppm, more preferably from 2,500 ppm to 120,000 ppm, most preferably from 5,000 ppm to 70,000 ppm. Further, in the case of the fluororubber, to the yield of the fluororubber finally obtained, the amount of the fluorinated emulsifier is preferably from 1,000 ppm to 50,000 ppm, more preferably from 2,000 ppm to 20,000 ppm, most preferably from 3,000 ppm to 10,000 ppm.

The stabilizing agent may, for example, be paraffin wax, fluorine type oil, fluorine type solvent or silicone oil. Such stabilizing agents may be used alone or in combination as a mixture of two or more of them.

As the polymerization initiator, a water-soluble radical initiator, a water-soluble oxidation-reduction type catalyst or the like is preferably employed. As the water-soluble radical initiator, preferred is a persulfate such as ammonium persulfate or potassium persulfate, or a water-soluble organic peroxide such as disuccinic acid peroxide, bisglutaric acid peroxide or tert-butyl hydroperoxide. Such polymerization initiators may be used alone or in combination as a mixture of two or more of them. An oil-soluble initiator may be used in the same manner.

In order to control the molecular weight of the fluorinated polymer or increase the stability of the aqueous fluorinated polymer emulsion, a chain transfer agent, such as a hydrocarbon, a halogenated hydrocarbon or an alcohol such as methanol or ethanol may be used. The chain transfer agent is preferably a hydrocarbon such as methane or ethane, or a halogenated hydrocarbon such as $CH_3Cl$ or $CH_2Cl_2$.

The concentration of the fluorinated polymer in the aqueous fluorinated polymer dispersion of the present invention is preferably from 10 to 50 mass %. If the concentration of the fluorinated polymer is too low, the efficiency for concentration to increase the concentration of the fluorinated polymer tends to be poor. On the other hand, if the concentration of the fluorinated polymer is too high, the stability as an aqueous emulsion cannot be maintained, and the handling tends to be difficult. The concentration of the fluorinated polymer is more preferably from 15 to 45 mass %, most preferably from 20 to 40 mass %.

The fluorinated polymer in the aqueous fluorinated polymer dispersion is dispersed as fine particles (referred to also as primary particles). The average particle size, for example, in the case of PTFE, is preferably from 0.10 µm to 0.50 µm, more preferably from 0.15 µm to 0.40 µm. If the average particle size is smaller than 0.10 µm, the molecular weight of PTFE generally tends to be remarkably low in many cases, and sufficient mechanical properties may not be obtained. If the average particle size is larger than 0.50 µm, it tends to be difficult to maintain the stability as an aqueous PTFE dispersion.

In the present invention, the fluorinated polymer in the aqueous fluorinated polymer dispersion may be a fluororesin or a fluorinated elastomer.

The fluororesin may, for example, be PTFE which is a homo-polymer of TFE, modified PTFE having no melt-moldability which is a copolymer of TFE with at least one fluorinated comonomer selected from the group consisting of hexafluoropropylene (hereinafter referred to as HFP), a perfluoro(alkyl vinyl ether) (hereinafter referred to as PFAVE), chlorotrifluoroethylene (hereinafter referred to as CTFE), a (perfloroalkyl)ethylene, vinylidene fluoride (hereinafter referred to as VdF) and a perfluoro(alkenyl vinyl ether) or a melt-moldable fluororesin.

The content of constituting units based on the fluorinated comonomer in modified PTFE is preferably at most 0.5 mass %, more preferably at most 0.4 mass %. Further, PFAVE may, for example, be perfluoro(propyl vinyl ether) or perfluoro (methyl vinyl ether).

The melt-moldable fluororesin may, for example, be a TFE/HFP copolymer (hereinafter referred to as FEP), a TFE/PFAVE copolymer (hereinafter referred to as PFA), an ethylene/TFE copolymer (hereinafter referred to as ETFE), an ethylene/chlorotrifluoroethylene copolymer (hereinafter referred to as ECTFE), polychlorotrifluoroethylene (hereinafter referred to as PCTFE), polyvinylidene fluoride (hereinafter referred to as PVdF) or polyvinyl fluoride (hereinafter referred to as PVF).

The fluorinated elastomer may, for example, be a TFE/propylene copolymer, a TFE/propylene/VdF copolymer, a VdF/HFP copolymer, a VdF/HFP/TFE copolymer or a TFE/PFAVE copolymer (hereinafter referred to as FFKM). PFAVE in FFKM is preferably perfluoro(methyl vinyl ether).

The fluorinated polymer is preferably at least one member selected from the group consisting of PTFE, modified PTFE, a TFE/HFP copolymer, a TFE/PFAVE copolymer, ETFE, ECTFE, PCTFE, PVdF, PVF, a TFE/propylene copolymer, a TFE/propylene/VdF copolymer, a VdF/HFP copolymer and a VdF/HFP/TFE copolymer.

The fluorinated polymer is more preferably PTFE, modified PTFE or a melt-moldable fluororesin.

The aqueous fluorinated polymer dispersion of the present invention is preferably an aqueous fluorinated polymer dispersion obtained by stabilizing an aqueous fluorinated polymer emulsion with a nonionic surfactant. The nonionic surfactant is preferably at least one member selected from the group consisting of a surfactant represented by the following formula (A), a surfactant represented by the following formula (B) and a surfactant represented by the following formula (C).

Formula (A): $R^1$—O-A-X (wherein $R^1$ is a $C_{8-18}$ alkyl group, A is a polyoxyalkylene chain composed of from 5 to 20 oxyethylene groups and from 0 to 2 oxypropylene groups, and X is a hydrogen atom or a methyl group.)

Formula (B): $R^2$—$C_6H_4$—O—B—Y (wherein $R^2$ is a $C_{4-12}$ alkyl group, —$C_6H_4$— is a phenylene group, B is a polyoxyethylene chain composed of from 5 to 20 oxyethylene groups, and Y is a hydrogen atom or a methyl group.)

Formula (C): $R^3$—O—C—Z (wherein $R^3$ is a $C_{6-18}$ alkyl group, C is a polyoxyalkylene chain composed of from 5 to 20 oxyethylene groups and from 0.1 to 3 oxybutylene groups, and Z is a hydrogen atom or a methyl group.)

Specific examples of the nonionic surfactant of the formula (A) include nonionic surfactants having molecular structures of e.g. $C_{13}H_{27}O(C_2H_4O)_{10}H$, $C_{12}H_{25}O(C_2H_4O)_{10}H$, $C_{10}H_{21}CH(CH_3)CH_2O(C_2H_4O)_9H$, $C_{13}H_{27}O(C_2H_4O)_8CH(CH_3)CH_2OH$, $C_{16}H_{33}O(C_2H_4O)_{10}H$ and $HC(C_5H_{11})(C_7H_{15})O(C_2H_4O)_9H$. The commercial products may be TERGITOL (registered trademark) 15S series manufactured by The Dow Chemical Company, Newcol (registered trademark) series manufactured by Nippon Nyukazai Co., Ltd. and LIONOL (registered trademark) TD series manufactured by Lion Corporation.

Specific examples of the nonionic surfactant of the formula (B) include nonionic surfactants having molecular structures of e.g. $C_8H_{17}$—$C_6H_4O(C_2H_4O)_{10}H$ and $C_9H_{19}$—$C_6H_4O(C_2H_4O)_{10}H$. The commercial products may be Triton (registered trademark) X series manufactured by The Dow Chemical Company, and NIKKOL (registered trademark) OP and NP series manufactured by Nikko Chemicals.

Specific examples of the nonionic surfactant of the formula (C) include $C_{13}H_{27}OCH_2CH(C_2H_5)O(C_2H_4O)_8H$, $C_{10}H_{21}CH(CH_3)CH_2OCH_2CH(C_2H_5)O(C_2H_4O)_8H$, $C_{10}H_{21}CH(CH_3)CH_2OCH(C_2H_5)CH_2O(C_2H_4O)_8H$, $C_{12}H_{25}OCH_2CH(C_2H_5)O(C_2H_4O)_8H$, $C_8H_{17}OCH_2CH(C_2H_5)O(C_2H_4O)_{10}H$, $C_{12}H_{25}OCH_2CH(C_2H_5)O(C_2H_4O)_{10}H$, $C_{13}H_{27}OCH_2CH(C_2H_5)O(C_2H_4O)_{11}H$, $C_{13}H_{27}OCH_2\ CH_2OCH_2CH(C_2H_5)O(C_2H_4O)_8H$, $C_{12}H_{25}O(CH_2CH(C_2H_5)O)_2(C_2H_4O)_8H$, $C_{10}H_{21}CH(CH_3)CH_2O(C_2H_4O)_9CH_2CH(C_2H_5)OH$, $C_{16}H_{33}OC_2H_4OCH(C_2H_5)CH_2O(C_2H_4O)_9H$, $C_{12}H_{25}OCH_2CH(C_2H_5)O(C_2H_4O)_8CH_2CH(C_2H_5)OH$, $C_{13}H_{27}OCH\ (CH_3)CH(CH_3)O(C_2H_4O)_8H$, $C_{10}H_{21}CH(CH_3)CH_2OCH(CH_3)CH(CH_3)O(C_2H_4O)_8H$, $C_{10}H_{21}CH(CH_3)CH_2OCH(CH_3)CH(CH_3)O(C_2H_4O)_8H$, $C_{12}H_{25}OCH(CH_3)CH(CH_3)O(C_2H_4O)_8H$, $C_8H_{17}OCH(CH_3)CH(CH_3)O(C_2H_4O)_{10}H$, $C_{12}H_{25}OCH(CH_3)CH(CH_3)O(C_2H_4O)_{10}H$, $C_{13}H_{27}OCH(CH_3)CH(CH_3)O(C_2H_4O)_{11}H$, $C_{13}H_{27}O(CH_2)_4O(C_2H_4O)_8H$, $C_{12}H_{25}O(CH_2)_4O(C_2H_4O)_8H$, $C_8H_{17}O(CH_2)_4O(C_2H_4O)_{10}H$, $C_{12}H_{25}O(CH_2)_4O(C_2H_4O)_{10}H$, $C_{13}H_{27}O(CH_2)_4O(C_2H_4O)_{11}H$, $C_{13}H_{27}O(CH_2)_2CH(CH_3)O(C_2H_4O)_8H$, $C_{12}H_{25}O(CH_2)_2CH(CH_3)O(C_2H_4O)_8H$, $C_8H_{17}O(CH_2)_2CH(CH_3)O(C_2H_4O)_{10}H$, $C_{12}H_{25}O(CH_2)_2CH(CH_3)O(C_2H_4O)_{10}H$ and $C_{13}H_{27}O(CH_2)_2\ CH(CH_3)O(C_2H_4O)_{11}H$.

The total content of the nonionic surfactants represented by the formulae (A), (B) and (C) is preferably from 1 to 20 mass %, more preferably from 1 to 10 mass %, particularly preferably from 2 to 8 mass % to the mass of the fluorinated polymer such as PTFE.

In the present invention, in a case where the fluorinated polymer is PTFE, the content of the fluorinated emulsifier in the aqueous fluorinated polymer dispersion before contact with WBIER is preferably from 750 ppm to 20,000 ppm, more preferably from 1,000 ppm to 20,000 ppm, most preferably from 1,000 ppm to 10,000 ppm, to the mass of the yield finally obtained.

In a case where the fluorinated polymer is a melt-moldable fluororesin, the content is preferably from 250 ppm to 250,000 ppm, more preferably from 2,500 ppm to 120,000 ppm, most preferably from 5,000 ppm to 70,000 ppm, to the mass of the melt-moldable fluororesin finally obtained.

In a case where the fluorinated polymer is a fluororubber, the content is preferably from 1,000 ppm to 50,000 ppm, more preferably from 2,000 ppm to 20,000 ppm, most preferably from 3,000 ppm to 10,000 ppm, to the mass of the fluororubber finally obtained.

WBIER of the present invention is preferably a resin having amino groups as ion-exchange groups. The resin may be a granular resin made of e.g. a styrene/divinylbenzene crosslinked resin, an acryl/divinylbenzene crosslinked resin or a cellulose resin. Among them, a granular resin made of a styrene/divinylbenzene crosslinked resin having amino groups as ion-exchange groups, is preferred.

The ion-exchange groups of WBIER are preferably primary to tertiary amino groups, more preferably secondary to tertiary amino groups, most preferably tertiary amino groups.

The average particle size of WBIER particles is preferably from 0.1 to 2 mm, more preferably from 0.2 to 1.3 mm, most preferably from 0.3 to 0.8 mm. When the average particle size of the particles is within a range of from 0.1 to 2 mm, clogging hardly takes place at the time when the aqueous fluorinated polymer dispersion passes therethrough. WBIER is preferably porous, and a porous type or a macroporous type having a high degree of crosslinking is more preferred. The ion-exchange capacity of WBIER is preferably from 1.0 to 2.5 (eq/1-R), more preferably from 1.3 to 1.7 (eq/1-R). Preferable commercial products of WBIER may, for example, be Lewatit (registered trademark) MP-62WS manufactured by LANXESS K.K., A-100 manufactured by Purolite, DOWEX MARATHON (registered trademark) WBA manufactured by The Dow Chemical Company and DIAION (registered trademark) WA-30 manufactured by Mitsubishi Chemical Corporation.

The method of contacting WBIER with the fluorinated emulsifier for adsorption is not particularly limited. It may specifically be a method wherein WBIER is put into the aqueous fluorinated polymer dispersion containing the fluorinated emulsifier, or a method wherein WBIER is is packed into a column, and the aqueous fluorinated polymer dispersion containing the fluorinated emulsifier is passed therethrough. When an aqueous fluorinated polymer dispersion contains a floating solid such as coagulum, it is advisable to remove the solid by a filter.

By means of a single stage filter or plural stage stacked filters, having a mesh size of 100 μm, it is advisable to carry out the filtration of the aqueous fluorinated polymer dispersion, and to remove such a floating solid.

At the time of contacting WBIER with the fluorinated emulsifier for adsorption, the contacting temperature may suitably be selected, but it is usually preferably around room temperature from 10 to 40° C. Further, the contacting time may suitably be selected, but in the case of contacting in a stirring system, it is usually preferably within a range of from 10 minutes to 200 hours. The contacting pressure is usually preferably atmospheric pressure, but it may be a reduced pressure or an elevated pressure. In this case, by repeating the procedure that WBIER is removed by the filtration and new WBIER is introduced, the time for lowering the concentration of the fluorinated emulsifier to a predetermined specific concentration can be shortened.

In a case where the fluorinated emulsifier in the aqueous fluorinated polymer dispersion is to be reduced by using a column packed with WBIER, the speed for passing through the column is preferably from 0.25 to 5.0 (1/hr), particularly preferably from 0.5 to 4.0 (1/hr) by space velocity, and preferably from 0.36 to 7.2 m/hr, particularly preferably from 0.72 to 5.4 m/hr by linear velocity. Here, the space velocity means how many times in volume of the volume of WBIER is permitted to flow per hour, and the linear velocity is a value calculated by dividing the flow amount per hour by the column cross-sectional area.

If the speed of passing through the column is smaller than 0.25 (1/hr) by space velocity or 0.36 m/hr by linear velocity, the fluorinated polymer particles tend to coagulate in the column, and it is likely that the adsorption and removal of the fluorinated emulsifier tend to be insufficient. Further, if the speed of passing through the column is higher than 5.0 (1/hr) by space velocity or 7.2 m/hr by linear velocity, it also tends to be difficult to remove the fluorinated emulsifier. In the latter case, the reason may be such that the fluorinated emulsifier adsorbed on the surface of WBIER is slow in its diffusion in WBIER particles.

The column packed with WBIER may be used alone, but it is also preferred that a plurality of such columns may be connected in series and used as connected columns. In the case where a plurality of columns are connected in series, the number of the columns connected in series is preferably from 2 to 10, more preferably from 2 to 6, most preferably from 2 to 4. If the number of the columns is too small, it tends to be difficult to improve the efficiency for the absorption of the fluorinated emulsifier, and if the number of the columns is too large, change of columns tends to be cumbersome. The method for connecting columns in series may be a method to connect the upper outlet of the first column at the inlet side to the lower inlet of the second column by using e.g. a pipe, and in a same manner, to connect other columns. Further, a plurality of rows of columns connected in series may be connected in parallel for passing the dispersion therethrough.

The adsorption amount of the fluorinated emulsifier to WBIER is generally preferably from 5 to 70 mol %, more preferably from 15 to 60 mol %, of the theoretical ion-exchange capacity of WBIER. The more the adsorption amount is, the higher the elusion efficiency is, but the efficiency for the adsorption of the fluorinated emulsifier during its reuse becomes low. With respect to WBIER having the fluorinated emulsifier adsorbed thereon, it is preferred to contact it with an aqueous alkaline solution of 60 to 105° C., to elute the fluorinated emulsifier and thereby to reproduce WBIER.

The aqueous alkaline solution is an aqueous solution of a hydroxide of an alkali metal. An aqueous sodium hydroxide solution, an aqueous potassium hydroxide solution, an aqueous lithium hydroxide solution, an aqueous rubidium hydroxide solution or an aqueous cesium hydroxide solution may be mentioned, and at least one of the solutions is used. Among them, an aqueous sodium hydroxide solution or an aqueous potassium hydroxide solution is preferred.

With respect to the concentration of the aqueous alkaline solution, generally, the higher the alkaline concentration, the lower the amount of the fluorinated emulsifier to be eluted. The concentration of the aqueous alkaline solution is preferably from 0.5 to 10 mass %, more preferably from 1.0 to 5.0 mass %, particularly preferably from 1.0 to 4.0 mass %.

In the present invention, the content of the fluorinated emulsifier in the aqueous fluorinated polymer dispersion after contacting with WBIER is preferably at most 200 ppm, more preferably from 1 ppm to 200 ppm, further preferably from 1 ppm to 150 ppm, to the fluorinated polymer.

In the process of the present invention, the reduction ratio of the content of the fluorinated emulsifier in the aqueous fluorinated polymer dispersion is preferably at least 80%, more preferably at least 90%, further preferably at least 95%, particularly preferably at least 97%.

The aqueous fluorinated polymer dispersion having a reduced content of a fluorinated emulsifier, which is obtained by the process of the present invention, can be concentrated by a known concentrating method, such as centrifugal sedimentation, electrophoresis or phase separation.

EXAMPLES

Now, the present invention will be described in further detail with reference to Examples and Comparative Examples, but it should be understood that the present invention is by no means thereby restricted. Methods for measuring the physical property values disclosed in Examples are as follows.

(A) Average primary particle size (unit: μm) of PTFE: Median size was measured by using a laser scattering particle size distribution analyzer (tradename "LA-920" manufactured by HORIBA, Ltd.).

(B) Standard specific gravity (hereinafter referred to also as SSG): Measured in accordance with ASTM D1457-91a and D4895-91a. 12.0 g of PTFE was weighed and held in a cylindrical mold having an inner diameter of 28.6 mm under 34.5 MPa for 2 minutes. This was put in an oven of 290° C. and heated at a rate of 120° C./hr. It was held at 380° C. for 30 minutes, then cooled at a rate of 60° C./hr and held at 294° C. for 24 minutes. After holding it in a desiccator at 23° C. for 12 hours, the specific gravity value of the molded product to water at 23° C. was measured, and it was taken as the standard specific gravity.

(C) Content (unit: ppm) of APFO in an aqueous PTFE dispersion before passing through WBIER: Into a test tube, 4 mL of a methylene blue solution (12 g of sulfuric acid was gradually added to about 500 mL of water, followed by cooling, then 0.03 g of methylene blue and 50 g of anhydrous sodium sulfate were dissolved therein, and water was added to 1 L) and 5 mL of chloroform were put, and further 0.1 g of a test sample was added. The mixture was vigorously shaken and then left to stand still. Then, the chloroform phase of the lower layer was sampled and passed through a filter with a pore size of 0.2 μm, whereupon the absorbance at 630 nm was measured by a spectrophotometer. Depending on the content of APFO, the chloroform phase exhibits a blue color. Using 0.1 g of an aqueous APFO solution having a preliminarily known concentration, the absorbance was measured in the same manner, and a calibration curve was prepared. Using such a calibration curve, the concentration of APFO in the sample of the aqueous PTFE dispersion was obtained. Then, the concentration of APFO was divided by the PTFE solid content to obtain the APFO content.

(D) Content (unit: ppm) of APFO in an aqueous PTFE dispersion after passing through WBIER: Using LC-MS (high performance liquid chromatography equipped with mass spectrometer), a calibration curve was preliminarily prepared from peak areas obtained by using aqueous APFO solutions with known concentrations, and from the measured peak area of a sample solution, the content was calculated. In the case of APFO in the aqueous PTFE dispersion, 50 g of the aqueous PTFE dispersion was dried at 70° C. for 16 hours, then APFO was extracted with ethanol, the peak area was measured by LC-MS, and by using the calibration curve, the concentration of APFO in the sample of the aqueous PTFE dispersion was obtained. Then, the concentration of APFO was divided by the PTFE solid content to obtain the APFO content.

Example 1

Into a 100 L stainless steel autoclave equipped with a baffle plate and a stirrer, 3.5 g of APFO, 797 g of paraffin wax and 56 liters of deionized water were charged. The air in the autoclave was replaced with nitrogen, and then the pressure was reduced. Then, the pressure was increased by adding TFE, and the temperature was raised to 70° C. with stirring. Then, the pressure was increased to 1.96 MPa by adding TFE, and 4.5 g of a disuccinic acid peroxide (hereinafter referred to as DSAP), which was dissolved in warm water at about 70° C., was injected. The inner pressure decreased to 1.94 MPa in about 1 minute and half.

While adding TFE to keep the inner pressure of the autoclave at 1.96 MPa, polymerization was proceeded by further adding 45 g of APFO. The reaction was terminated at a point where the amount of TFE injected reached 22.5 kg, and TFE in the autoclave was released to the atmosphere. The polymerization time was 190 minutes. The amount of DSAP used in the polymerization was 54 ppm to the whole system. The obtained aqueous PTFE emulsion was cooled, and the supernatant paraffin wax was removed. The aqueous emulsion had a solid content concentration of about 27 mass %. The APFO used was 2,160 ppm, based on the mass of the final yield of PTFE. Further, the average primary particle size was 0.3 µm. Aggregates in the reactor were just about a trace.

This aqueous PTFE emulsion was diluted with pure water to a concentration of 10 mass % and adjusted to 20° C., followed by stirring, thereby to obtain a fine powder. Then, this fine powder was dried at 120° C. SSG was 2.16.

In the aqueous PTFE emulsion, nonionic surfactant $C_{13}H_{27}OCH_2CH(C_2H_5)O(C_2H_4O)_8H$ (manufactured by Nippon Nyukazai Co., Ltd., hereinafter referred to as nonionic surfactant 1) was dissolved in a proportion of 3 mass % to the mass of PTFE to obtain an aqueous PTFE dispersion. Further, succinic acid (pKa 4.21) was dissolved in an amount of 185 ppm to the whole mass of the aqueous PTFE dispersion to obtain an aqueous PTFE dispersion for a test. The content of APFO in the aqueous PTFE dispersion for a test was 2,100 ppm to the mass of the aqueous PTFE dispersion.

In a transparent acrylic pipe having an inner diameter of 9 mm, as WBIER, Lewatit (registered trademark) MP62WS (manufactured by Lanxess K.K., macroporous type, OH type, ion-exchange group: tertiary amine, average particle size: 0.55 mm, total ion-exchange capacity: 1.7 eq/1-R) was packed so as that the resin bed height became 82 cm, and the aqueous PTFE dispersion for a test was passed therethrough at a rate of 130 cc/hr by a tube pump. The aqueous PTFE dispersion flowing out at an interval of predetermined passing-through amount was collected, and the concentration of APFO was measured. The speed for passing through was 2.5 (1/hr) by space velocity and 2.1 (m/hr) by linear velocity. At the time when the passing-through amount of the aqueous PTFE dispersion for a test reached 175 times the volume of WBIER, the content of APFO in the collected aqueous PTFE dispersion was 100 ppm, and at the time when the passing-through amount reached 200 times the volume of WBIER, the content of APFO in the collected aqueous PTFE dispersion was 110 ppm. Thus, sufficient efficiency for the adsorption was shown.

The reduction ratio of APFO in the aqueous PTFE dispersion for a test was 95%. In Table 1, they are represented by APFO (ppm/PTFE) at 175BV and APFO (ppm/PTFE) at 200BV, respectively. Further, the passing-through amount, until the content of APFO in the aqueous PTFE dispersion exceeded 100 ppm, was 100 times the volume of WBIER. In Table 1, it is represented by BV at APFO 100 ppm/PTFE. The pH of the aqueous PTFE dispersion before passing-through WBIER was 3.3. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 8.2. In Table 1, they are represented by pH at 25BV and pH at 200BV, respectively. Here, BV is a value obtained by dividing the volume of the aqueous PTFE dispersion which contacted with WBIER by the volume of WBIER, and means the passing-through amount.

Example 2

A test for passing through was conducted in the same manner as in Example 1 except that succinic acid was dissolved in an amount of 370 ppm to the whole mass of the aqueous PTFE dispersion. The content of APFO in the aqueous PTFE dispersion for a test was 2,100 ppm.

At the time when the passing-through amount of the aqueous PTFE dispersion for a test reached 175 times the volume of WBIER, the content of APFO in the collected aqueous PTFE dispersion was 30 ppm, and at the time when the passing-through amount reached 200 times the volume of WBIER, the content of APFO in the collected aqueous PTFE dispersion was 40 ppm.

Further, the passing-through amount, until the content of APFO in the aqueous PTFE dispersion exceeded 100 ppm, was 370 times the volume of WBIER.

Thereafter, the passing through was continued, and the passing-through amount, until the concentration of APFO in the aqueous PTFE dispersion exceeded 200 ppm which is equivalent to the content reduced to about 90% of the concentration before passing through, was 450 times the volume of WBIER. The pH of the aqueous PTFE dispersion before passing through WBIER was 3.2. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 3.9.

Then, the aqueous PTFE dispersion, which was collected at the time when the total amount of passing through from the start reached 200 times the volume of WBIER, was further passed through a transparent acrylic pipe having an inner diameter of 9 mm and packed with Lewatit (registered trademark) MP62WS so that the resin bed height became 82 cm which corresponds to the second column, at a rate of 130 cc/hr by using a tube pump. This means that two WBIER columns were connected in series, and the space velocity was 1.3 (1/hr) and the linear velocity was 2.1 (m/hr). As a result, the content of APFO decreased to 10 ppm. The reduction ratio of APFO in the aqueous PTFE dispersion for a test was at least 99.5%.

Example 3

A test for passing through was conducted in the same manner as in Example 1 except that 285 ppm of lactic acid (pKa 3.86) was used instead of 185 ppm of succinic acid. The number of mols of lactic acid used was the same as the one of succinic acid used in Example 2. The content of APFO in the aqueous PTFE dispersion for a test was 2,100 ppm.

At the time when the passing-through amount of the aqueous PTFE dispersion for a test reached 175 times the volume of WBIER, the content of APFO in the collected aqueous PTFE dispersion was 12 ppm, and at the time when the passing-through amount reached 200 times the volume of WBIER, the content of APFO in the collected aqueous PTFE dispersion was 20 ppm.

Further, the passing-through amount, until the content of APFO in the aqueous PTFE dispersion exceeded 100 ppm, was 310 times the volume of WBIER. Thereafter, the passing through was continued, and the passing-through amount, until the concentration of APFO in the aqueous PTFE dispersion exceeded 200 ppm which is equivalent to the content reduced to about 90% of the concentration before passing through, was 380 times the volume of WBIER. The pH of the aqueous PTFE dispersion before passing through WBIER was 3.0. After starting the passing through, at the time when the passing-through amount reached 25 times the volume of WBIER, the pH of the collected aqueous PTFE dispersion was 8.5, and at the time when the passing-through amount reached 200 times the volume of WBIER, the pH of the collected aqueous PTFE dispersion was 7.0.

Example 4

A test for passing through was conducted in the same manner as in Example 1 except that 415 ppm of glutaric acid (pKa 4.34) was used instead of 185 ppm of succinic acid. The number of mols of glutaric acid used was the same as the one of succinic acid used in Example 2. The content of APFO in the aqueous PTFE dispersion was 2,100 ppm. At the time when the passing-through amount of the aqueous PTFE dispersion for a test reached 175 times the volume of WBIER, the content of APFO in the collected aqueous PTFE dispersion was 50 ppm, and at the time when the passing-through amount reached 200 times the volume of WBIER, the content of APFO in the collected aqueous PTFE dispersion was 70 ppm. Thus, sufficient efficiency for the adsorption was shown. The reduction ratio of APFO in the aqueous PTFE dispersion for a test was 97%. Further, the passing-through amount, until the content of APFO in the aqueous PTFE dispersion exceeded 100 ppm, was 250 times the volume of WBIER.

The pH of the aqueous PTFE dispersion before the passing through WBIER was 3.2. After starting the passing through, at the time when the passing-through amount reached 25 times the volume of WBIER, the pH of the collected aqueous PTFE dispersion was 8.9, and at the time when the passing-through amount reached 200 times the volume of WBIER, the pH of the collected aqueous PTFE dispersion was 3.8.

Example 5

A test for passing through was conducted in the same manner as in Example 1 except that 325 ppm of malonic acid (pKa 2.86) was used instead of 185 ppm of succinic acid. The number of mols of malonic acid used was the same as the one of succinic acid used in Example 2. The content of APFO in the aqueous PTFE dispersion was 2,100 ppm. At the time when the passing-through amount of the aqueous PTFE dispersion for a test reached 175 times the volume of WBIER, the content of APFO in the collected aqueous PTFE dispersion was 75 ppm, and at the time when the passing-through amount reached 200 times the volume of WBIER, the content of APFO in the collected aqueous PTFE dispersion was 85 ppm. Thus, sufficient efficiency for the adsorption was shown. The reduction ratio of APFO in the aqueous PTFE dispersion for a test was 96%. Further, the passing-through amount, until the content of APFO in the aqueous PTFE dispersion exceeded 100 ppm, was 240 times the volume of WBIER. The pH of the aqueous PTFE dispersion before passing through WBIER was 2.7. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 5.8.

Example 6

A test for passing through was conducted in the same manner as in Example 1 except that 470 ppm of tartaric acid (pKa 3.04) was used instead of 185 ppm of succinic acid. The number of mols of tartaric acid used was the same as the one of succinic acid used in Example 2. The content of APFO in the aqueous PTFE dispersion was 2,100 ppm. At the time when the passing-through amount of the aqueous PTFE dispersion for a test reached 175 times the volume of WBIER, the content of APFO in the collected aqueous PTFE dispersion was 100 ppm, and thus, sufficient efficiency for the adsorption was shown. Thereafter, the passing-through amount reached 200 times the volume of WBIER, the content of APFO in the collected aqueous PTFE dispersion increased to 200 ppm. The reduction ratio of APFO in the aqueous PTFE dispersion for a test was 96%.

Further, the passing-through amount, until the content of APFO in the aqueous PTFE dispersion exceeded 100 ppm, was 200 times the volume of WBIER. The pH of the aqueous PTFE dispersion before passing through WBIER was 2.7. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 3.2.

TABLE 1

|  | Ex. 1 | Ex. 2 | Ex. 3 | Ex. 4 | Ex. 5 | Ex. 6 |
| --- | --- | --- | --- | --- | --- | --- |
| Organic carboxylic acid added | Succinic acid | Succinic acid | Lactic acid | Glutaric acid | Malonic acid | Tartaric acid |
| Content (ppm) | 185 | 370 | 285 | 415 | 325 | 470 |
| pKa (250° C., first stage) | 4.21 | 4.21 | 3.86 | 4.34 | 2.86 | 3.04 |
| APFO (ppm/PTFE) at 175 BV | 100 | 30 | 12 | 50 | 75 | 100 |
| APFO (ppm/PTFE) at 200 BV | 110 | 40 | 20 | 70 | 85 | 200 |
| BV at APFO 100 ppm/PTFE | 100 | 370 | 310 | 250 | 240 | 175 |
| BV at APFO 200 ppm/PTFE | — | 450 | 380 | — | — | 200 |
| pH of an aqueous PTFE dispersion supplied | 3.3 | 3.2 | 3.0 | 3.2 | 2.7 | 2.7 |

TABLE 1-continued

|  | Ex. 1 | Ex. 2 | Ex. 3 | Ex. 4 | Ex. 5 | Ex. 6 |
|---|---|---|---|---|---|---|
| pH at 25 BV | 9.0 | 9.0 | 8.5 | 8.9 | 9.0 | 9.0 |
| pH at 200 BV | 8.2 | 3.9 | 7.0 | 3.8 | 5.8 | 3.2 |

Comparative Example 1

A test for passing through was conducted in the same manner as in Example 1 except that 185 ppm of succinic acid was not added. The concentration of APFO in the aqueous PTFE dispersion monotonously increased as the passing-through amount increased, and in a collection where the passing-through amount reached 165 times the volume of WBIER, the content of APFO in the aqueous PTFE dispersion exceeded 200 ppm which is equivalent to the content reduced to about 90% of the concentration before passing through. The passing-through amount was about 37% of the one of Example 2 wherein the passing-through amount was 450 times the volume of WBIER, and thus, low efficiency for ion-exchange was shown. Further, this means that only about 15% of the ion-exchange capacity of WBIER was used for ion-exchange.

Further, the passing through was continued, whereby at the time when the passing-through amount reached 175 times the volume of WBIER, the content of APFO in the collected aqueous PTFE dispersion was 220 ppm, and at the time when the passing-through amount reached 200 times the volume of WBIER, the content of APFO in the collected aqueous PTFE dispersion was 250 ppm. Further, the passing-through amount, until the content of APFO in the aqueous PTFE dispersion exceeded 100 ppm, was 70 times the volume of WBIER. The pH of the aqueous PTFE dispersion before passing through WBIER was 3.5. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 8.6.

Comparative Example 2

A test for passing through was conducted in the same manner as in Example 1 except 280 ppm of oxalic acid (pKa 1.27) was used instead of 185 ppm of succinic acid. The number of mols of oxalic acid used was the same as the one of succinic acid used in Example 2. The content of APFO in the aqueous PTFE dispersion was 2,100 ppm. The concentration of APFO in the aqueous PTFE dispersion monotonously increased as the passing-through amount increased, and at the time when the passing-through amount reached 175 times the volume of WBIER, the content of APFO in the collected aqueous PTFE dispersion was 180 ppm, and in a collection where the passing-through amount reached 200 times the volume of WBIER, the concentration of APFO in the aqueous PTFE dispersion exceeded 200 ppm which is equivalent to the content reduced to about 90% of the concentration before passing through.

Further, the passing-through amount, until the content of APFO in the aqueous PTFE dispersion exceeded 100 ppm, was 60 times the volume of WBIER. The pH of the aqueous PTFE dispersion before passing through WBIER was 2.3. After starting the passing through, at the time when the passing-through amount reached 25 times the volume of WBIER, the pH of the collected aqueous PTFE dispersion was 9.0, and at the time when the passing-through amount reached 200 times the volume of WBIER, the pH of the collected aqueous PTFE dispersion was 7.8.

TABLE 2

|  | Comp. Ex. 1 | Comp. Ex. 2 |
|---|---|---|
| Organic carboxylic acid added | — | Oxalic acid |
| Content (ppm) | — | 280 |
| pKa (250° C., first stage) | — | 1.27 |
| APFO (ppm/PTFE) at 175 BV | 220 | 180 |
| APFO (ppm/PTFE) at 200 BV | 250 | 200 |
| BV at APFO 100 ppm/PTFE | 70 | 60 |
| BV at APFO 200 ppm/PTFE | 165 | 200 |
| pH of an aqueous PTFE dispersion supplied | 3.5 | 2.3 |
| pH at 25 BV | 9.0 | 9.0 |
| pH at 200 BV | 8.6 | 7.8 |

INDUSTRIAL APPLICABILITY

The aqueous fluorinated polymer dispersion having a reduced content of a fluorinated emulsifier obtained by the process of the present invention can be used as an aqueous fluorinated polymer dispersion as it is, or after being concentrated by a known concentrating method, followed by incorporating e.g. a nonionic surfactant, a non-fluorinated emulsifier, a preservative or a viscosity-adjusting agent. The obtained aqueous fluorinated polymer dispersion may be used in various applications to e.g. an electronic material such as a printed board, a roof material for a membrane architectural structure, a surface coating material of kitchen utensil, a fluorinated polymer fiber by spinning to form a PTFE fiber, a dust-preventing agent, an active material binder for battery and an additive to plastics.

The entire disclosure of Japanese Patent Application No. 2006-316821 filed on Nov. 24, 2006 including specifications, claims and summaries is incorporated herein by reference in its entirety.

What is claimed is:

1. A process for producing an aqueous fluorinated polymer dispersion having a reduced content of a fluorinated emulsifier, wherein the process comprises:

adding an organic carboxylic acid represented by the following formula (1):

$$Q(CH_2)_m(CH(OH))_nCOOH \qquad (1)$$

wherein Q is H, $CH_3$ or COOH, m and n each independently represent 0 or an integer of from 1 to 4, and $4 \geq n+m \geq 1$, to an aqueous fluorinated polymer dispersion comprising a fluorinated emulsifier; and then contacting with a weakly basic anion-exchange resin to adsorb and remove the fluorinated emulsifier.

2. The process for producing an aqueous fluorinated polymer dispersion according to claim 1, wherein the organic carboxylic acid represented by the formula (1) is HOCO$(CH_2)_p$COOH, wherein p is an integer of from 1 to 4.

3. The process for producing an aqueous fluorinated polymer dispersion according to claim 1, wherein the organic carboxylic acid represented by the formula (1) is $HOCOCH_2CH(OH)COOH$ or $CH_3CH(OH)COOH$.

4. The process for producing an aqueous fluorinated polymer dispersion according to claim 1, wherein the aqueous fluorinated polymer dispersion is an aqueous dispersion of polytetrafluoroethylene.

5. The process for producing an aqueous fluorinated polymer dispersion according to claim 4, wherein the standard specific gravity of the polytetrafluoroethylene in the aqueous polytetrafluoroethylene dispersion is from 2.15 to 2.20.

6. The process for producing an aqueous fluorinated polymer dispersion according to claim 1, wherein the content of the fluorinated emulsifier in the aqueous fluorinated polymer dispersion after contact with the weakly basic anion-exchange resin is from 1 ppm to 200 ppm to the fluorinated polymer.

7. The process for producing an aqueous fluorinated polymer dispersion according to claim 1, wherein the content of the fluorinated emulsifier in the aqueous fluorinated polymer dispersion before contact with the weakly basic anion-exchange resin is from 750 ppm to 20,000 ppm to polytetrafluoroethylene in a case where the fluorinated polymer is the polytetrafluoroethylene, from 250 ppm to 250,000 ppm to a melt-moldable fluororesin in a case where the fluorinated polymer is the melt-moldable type fluororesin, and from 1,000 ppm to 50,000 ppm to a fluororubber in a case where the fluorinated polymer is the fluororubber.

8. The process for producing an aqueous fluorinated polymer dispersion according to claim 1, wherein the content of the organic carboxylic acid in the aqueous fluorinated polymer dispersion is from 100 ppm to 1,000 ppm to the aqueous fluorinated polymer dispersion.

9. An aqueous fluorinated polymer dispersion having a reduced content of a fluorinated emulsifier, produced by the process for producing an aqueous fluorinated polymer dispersion as defined in claim 1.

* * * * *